United States Patent [19]
Partus

[11] Patent Number: 6,161,398
[45] Date of Patent: Dec. 19, 2000

[54] METHODS OF AND SYSTEMS FOR VAPOR DELIVERY CONTROL IN OPTICAL PREFORM MANUFACTURE

[75] Inventor: Fred Paul Partus, Atlanta, Ga.

[73] Assignee: Lucent Technologies, Inc., Murray Hill, N.J.

[21] Appl. No.: 09/057,840

[22] Filed: Apr. 9, 1998

[51] Int. Cl.$^7$ .................................................. C03B 37/07
[52] U.S. Cl. .......................... 65/379; 65/413; 65/29.15; 65/17.3; 264/1.24; 264/1.27; 264/81; 427/8; 427/126; 427/127
[58] Field of Search ............................ 65/413, 421, 377, 65/379, 384, 17.3, 29.12, 29.15, 144, 158, 160, 162; 261/127, 128, 135; 264/1.1, 1.21, 1.24, 1.27, 81; 427/8, 126, 127

[56] References Cited

U.S. PATENT DOCUMENTS

| | | | |
|---|---|---|---|
| 3,583,685 | 6/1971 | Boerger et al. | 261/128 |
| 3,801,294 | 4/1974 | Schultz et al. | 65/390 |
| 3,826,560 | 7/1974 | Schultz | 350/96 |
| 4,194,807 | 3/1980 | Gliemeroth | 385/124 |
| 4,217,027 | 8/1980 | MacChesney et al. | 350/96.3 |
| 4,220,460 | 9/1980 | Partus | 65/530 |
| 4,235,829 | 11/1980 | Partus | 261/121 |
| 4,276,243 | 6/1981 | Partus | 261/128 |
| 4,278,458 | 7/1981 | O'Connor et al. | 65/384 |
| 4,582,480 | 4/1986 | Lynch et al. | 432/1 |
| 4,894,079 | 1/1990 | Shiomi | 65/413 |
| 5,051,096 | 9/1991 | Cooke et al. | 439/61 |
| 5,145,508 | 9/1992 | Fujiura et al. | 65/388 |
| 5,277,889 | 1/1994 | Power et al. | 423/491 |
| 5,425,902 | 6/1995 | Miller et al. | 261/128 |
| 5,501,098 | 3/1996 | Cadet et al. | 73/24.01 |
| 5,599,371 | 2/1997 | Cain et al. | 65/413 |
| 5,707,415 | 1/1998 | Cain | 65/379 |

FOREIGN PATENT DOCUMENTS

| | | |
|---|---|---|
| 0 040 540 | 11/1981 | European Pat. Off. . |
| 63-176328 | 7/1988 | Japan . |
| 04342434 | 11/1992 | Japan . |
| 08259239 | 10/1996 | Japan . |

*Primary Examiner*—Sean Vincent

[57] ABSTRACT

A method and system are described for controlling the delivery of vapor from a bubbler containing a supply of liquid through which a carrier gas is bubbled and from which bubbler vapors are delivered in a vapor stream entrained with the carrier gas. In general, the present invention involves utilizing the pressure of the vapor leaving the bubbler as the specific characteristic monitored and controlled to ensure that the concentration level of carrier gas to vapor is maintained at the desired level throughout the manufacturing process.

The present invention involves introducing a concentration detector within the flow path of the bubbler vapors from the bubbler and having the output of the concentration detector input to a concentration controller. The concentration controller compares the concentration value received from the concentration detector to a desired concentration value determined for the system. In order to correct for any discrepancies between the measured and desired concentration levels, the concentration controller activates the opening and/or closing of a valve, which as the concentration detector is positioned within the flow of bubbler vapor exiting the bubbler.

12 Claims, 2 Drawing Sheets

METHODS OF AND SYSTEMS FOR VAPOR DELIVERY CONTROL IN OPTICAL PREFORM MANUFACTURE

TECHNICAL FIELD

This invention relates to methods of and systems for vapor delivery control. More particularly, it relates to the controlling of the concentration level of vapor which is delivered to a deposition site where it is used in the manufacture of optical preforms from which lightguide fiber is drawn.

BACKGROUND OF THE INVENTION

The use of optical fiber communication systems has increased significantly during the last few years. It appears likely that the use of this mode of communications will continue to increase in the future. Not surprisingly, companies engaged in the manufacture of components for these systems continue to seek ways to reduce their costs. One approach is to enhance the efficiencies of handling materials involved in the production of optical preforms, from which optical fibers may be drawn.

Presently, optical preforms are being manufactured in a number of different processes which include vapor deposition as a materials-forming technique. These processes are used to manufacture optical preforms which is a very early step in making lightguide optical fibers. One such process which is known as a modified chemical vapor deposition (herein after MCVD) process is described in J. B. MacChesney "Materials and Processes for Preform Fabrications—Modified Chemical Deposition," Vol. 64, proceedings of IEEE, pages 1181–1184 (1980).

Input to the MCVD process generally comprises a carrier gas and reactant vapors such as germanium tetrachloride ($GeCl_4$), silicon tetrachloride ($SiCl_4$) and phosphorous oxychloride ($POCl_3$). These reactant vapors are supplied from vaporizers commonly referred to as deposition bubblers and are passed to a deposition site such as a glass substrate tube. An optical preform is manufactured by sequentially heating portions of the substrate tube to a temperature in the range of 1600° C. to 1800° C. to react the vapors as they flow through the bore of the tube and deposit them within the substrate tube. In the manufacture of preforms using the MCVD technique, the reactant vapors need to be mixed or blended precisely and delivered at controlled concentration levels to the substrate tube (as opposed to a torch for other manufacturing techniques discussed later). To date, such controlled delivery has been achieved by bubbling a carrier gas such as oxygen ($O_2$), argon (Ar), helium (He) and/or nitrogen ($N_2$), for example, through heated supplies of the reactant materials in liquid form in bubblers and then to the deposition site with the vapors entrained in the carrier gases.

Typically, a deposition bubbler includes a container in which a carrier gas intake conduit terminates in an orifice located below the free surface of liquid contained therein. An outlet conduit provides fluid communication between the space above the surface of the liquid and the vapor deposition site. Exemplary of deposition systems employing bubblers is that illustrated in U.S. Pat. Nos. 3,826,560, and 4,276,243.

Inasmuch as vapor of the liquid contained within a deposition bubbler is withdrawn during deposition, the level of liquid drops unless the bubbler is replenished from an auxiliary source. In some applications, decreases in the level of liquid within the bubbler have little effect. In other applications, however, such as in vapor deposition processes employed in the manufacture of optical fiber preforms, variations in the liquid level may have an adverse effect such as changing the concentration level of the delivered vapor.

The vaporization rate also is dependent upon several other factors including the flow characteristics of the carrier gas bubbled through the liquid. For example, the size of the bubbles, as they rise through the liquid, has an effect on the rate of vaporization. The rate of flow of the carrier gas introduced into the bubbler also affects the rate of vaporization, as does the residence time of the bubbles which, of course, depends on the depth at which the carrier gas is introduced and in turn, on the rate of replenishing the liquid relative to the rate of use as discussed above. Another factor is the control of the heat transfer into the bubbler which is affected by significant changes in the quantity of liquid in the bubbler. Although it is possible to program a heater controller to account for some of these variables as changes in the level of liquid are continuously monitored, that approach is complex and does not satisfy completely the needed control for vapor delivery.

In addition to the references listed above, U.S. Pat. No. 4,235,829 which issued on Nov. 25, 1980 to Fred P. Partus is noted. In it, there is shown a vapor delivery system which comprises a deposition bubbler adapted to generate and to deliver vapor from a liquid contained therein and in a reservoir in fluid communication with the bubbler. Facilities are provided for sensing the level of the liquid contained within the bubbler and for providing gaseous head pressures in the reservoir of magnitudes dependent upon the sensed liquid level. The liquid level in the bubbler drops as liquid is vaporized and withdrawn from the bubbler whereupon the level is adjusted by increasing the pressure head in the reservoir to feed liquid to the bubbler. Although the system works well, perturbations in the deposition bubbler caused by a drop in liquid level and then a rise due to the changing of the pressure in the reservoir can to an extent affect adversely the rate of vaporization and hence the concentration level of the vapor. These level changes are increased as the rate of deposition and hence the rate of withdrawal of vapor are increased.

Additionally, commonly-assigned U.S. Pat. No. 4,276,243 which issued on Jun. 30, 1981 to Fred P. Partus discloses a similar vapor delivery system which utilizes the temperature of the liquid as the characteristic to be monitored and manipulated to control the concentration level at the desired value. However, while this system is effective, the slow rate at which the overall temperature of the liquid can be changed, particularly cooled, often results in an unwanted delay in achieving the desired concentration level corrections.

There also exists systems in which, for example, one bubbler is positioned within another with both bubblers being depleted substantially sequentially. An exemplary system of this type is described in U.S. Pat. No. 4,582,480, which issued on Apr. 15, 1986 in the names of Lynch et al.

A satisfactory solution for the problem of controlling, accurately and with rapid response time, the concentration level of the carrier gas and the vapor being delivered to a deposition site, such as a substrate tube used in the manufacture of optical preforms would be quite advantageous.

SUMMARY OF THE INVENTION

The foregoing problem has been overcome by the method and system of this invention. In accordance with the present invention, a method and system is described for controlling the delivery of vapor from a bubbler containing a supply of liquid through which a carrier gas is bubbled and from which bubbler vapors are delivered in a vapor stream entrained with the carrier gas. In general, the present invention involves utilizing the pressure of the gas leaving the bubbler as the specific characteristic monitored and controlled to ensure that the concentration level of carrier gas to vapor is maintained at the desired level throughout the manufacturing process.

The present invention involves introducing a concentration detector within the flow path of the bubbler vapors from the bubbler and having the output of the concentration detector input to a concentration controller. The concentration controller compares the concentration value received from the concentration detector to a desired concentration value determined for the system. In order to correct for any discrepancies between the measured and desired concentration levels, the concentration controller activates the operation of a pressure varying device, such as the opening and/or closing of a valve.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

In general, the present invention describes a vapor delivery system for use in manufacturing an optical preform from which lightguide optical fiber is drawn. The system is designed to provide a vapor stream of a vaporizable liquid which is contained in a reservoir and in a vaporizer system. The reservoir may be a shipping container which need not be connected permanently to the vapor delivery system. A carrier gas, such as oxygen ($O_2$), argon (Ar), helium (He) and/or nitrogen ($N_2$), for example, is bubbled through the liquid in the vaporizer system to cause the gas to be entrained with a vapor of the liquid and fed to a vapor deposition site such as a lathe (not shown) of an MCVD system. See for example U.S. Pat. No. 4,217,027 which issued on Aug. 12, 1980 in the names of J. B. MacChesney et al. and which is expressly incorporated by reference herein.

While the MCVD process is initially disclosed herein as the manufacturing technique used at the deposition site for creating an optical product having a core region and a clad region, other known approaches such as vapor axial deposition (VAD) and outside vapor deposition (OVD), may also benefit from use of the vapor delivery system of the present invention. However, one operational difference is that the reactant vapors are delivered to a torch during both the VAD and OVD processes as opposed to a substrate tube during the MCVD process.

In accordance with the present invention, a pressure valve, or other means to effect the pressure, within an output vapor conduit from the vaporizer system is utilized to control the concentration level of vapor entrained within the carrier gas and maintain the desired concentration level needed for the ultimate optical fiber being produced.

Although the particular units used to describe the concentration level is not critical, for convenience, as used herein concentration level refers to the molar concentration of the vapor of the liquid and the carrier gas.

Figure 1:
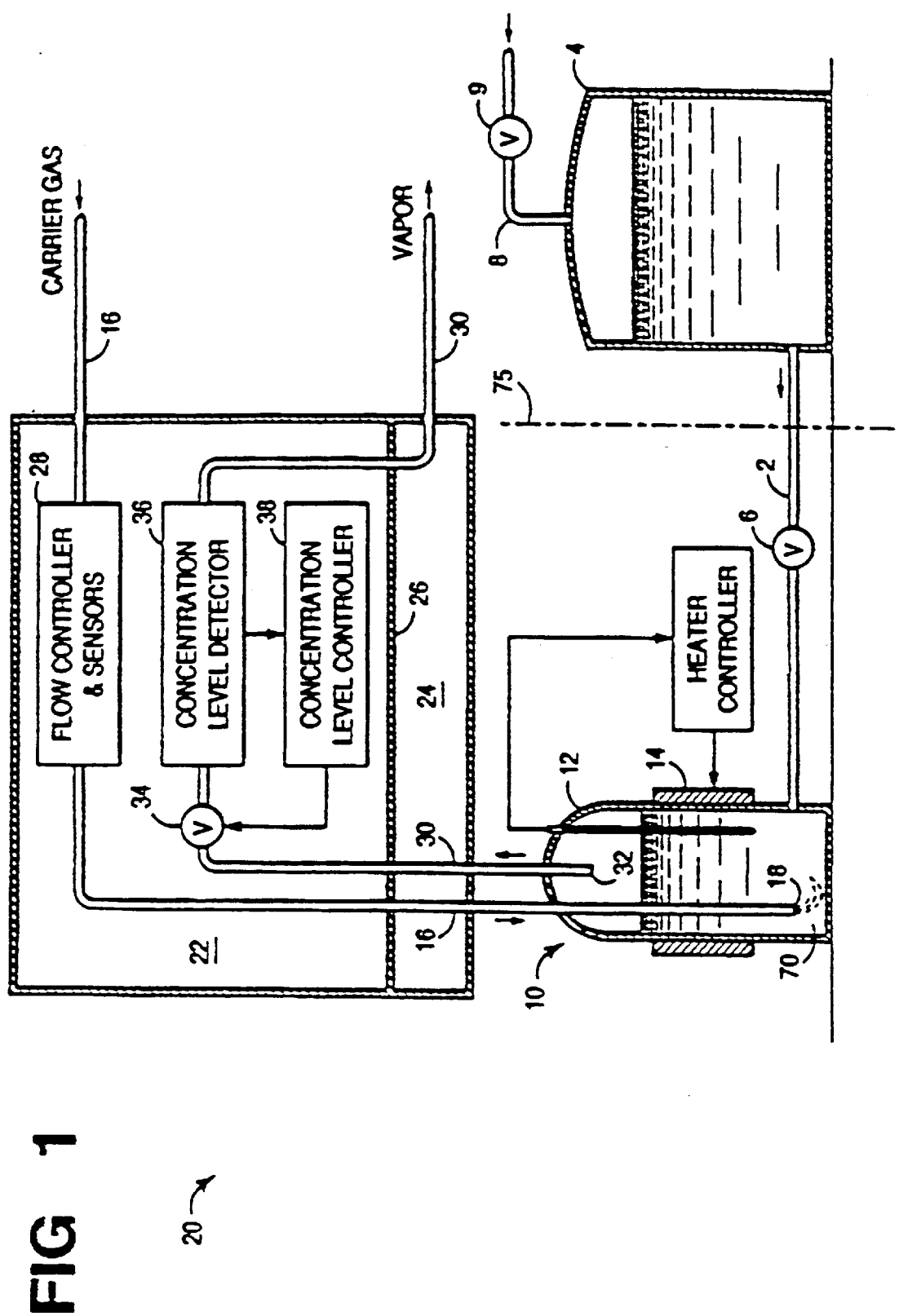
FIG. 1 is a schematic diagram of a preferred embodiment of a vapor delivery system embodying the principles of this invention.

As illustrated in FIG. 1, one system in accordance with the present invention includes a conduit 2 which provides fluid communication between the reservoir 4 and the vaporizer system 10. A valve 6 is inserted into the conduit 2 between the reservoir 4 and the vaporizer system 10. The reservoir 4 is dimensioned to have a capacity several orders of magnitude greater than that of the vaporizer system 10. The reservoir 4, the vaporizer system 10 and the conduit 2 are constructed of a material that is water and OH impermeable such as glass or metal, for example. A gas intake line 8 extends upwardly from the top of the reservoir 4 through a valve and pressure regulator 9 to a source (not shown) of compressed gas which may be the same as the carrier gas. The pressure of the gas is adjusted as needed to either transfer liquid from the reservoir 4 to the vaporizer system 10 or to maintain a reservoir head pressure.

As an example of one design arrangement of a fluid transfer system that can be used in accordance with the present invention, the vaporizer system 10 is shown to comprise a vaporizer in the form of a bubbler 12 which preferably has a resistance heater 14 jacketed about the exterior surface of the bubbler 12. A carrier gas intake conduit 16 extends from an unshown source of pressurized gas laterally into an upper space 22 of a temperature-controlled enclosure 20 and through a flow controller unit 28. As a matter of note, the heater control is a conventional power controller such as the 3-mode power controller sold by Research, Inc. As Model No. 639B.

In the exemplary fluid transfer system shown, after passing from the flow controller unit 28 the conduit 16 is directed downwardly through a partition 26 and through a lower space 24 within the enclosure 20. The conduit 16 then exits the enclosure 20 and extends further downwardly into the bubbler 12 terminating with a lower outlet 18 located near the bottom of bubbler 12. A vapor stream conduit 30 extends upwardly from an intake orifice 32 located at the top of the bubbler 12 into the temperature-controlled enclosure 20. As a result of processing within the vaporizer system 10, output vapor stream conduit 30 contains carrier gas entrained with vapors of the liquid to be transferred to the deposition site such as a lathe. It should be noted that the orientation of the conduit 30 is preferably vertical as it leaves the bubbler 12 so that any condensation or aerosol which might occur within this portion of the conduit gravitates back into the bubbler. Additionally, it should be understood that numerous vapor stream conduits like 30 may juncture with other, unshown vapor stream conduits from other vaporizer systems and then out of the enclosure 20 to a selected vapor deposition site or station.

In accordance with one embodiment of the present invention, the pressure value within output vapor conduit 30 is utilized to control the concentration level of vapor entrained within the carrier gas and maintain the desired concentration level needed for the ultimate optical fiber being produced. As illustrated, conduit 30 extends up and out of the vaporizer system 10 and into temperature-controlled enclosure 20. A valve 34 and a concentration level detector 36 are introduced in the portion of conduit 30 located within the temperature-controlled enclosure 20. The concentration level detector 36 ascertains the ratio of vaporized liquid to carrier gas and transfers this ratio or concentration level to a concentration level controller 38. It is important to note that the concentration level detector 36 may be positioned on either the low-pressure side or the high-pressure side of valve 34 and still be effective in accordance with the present invention since the principles of ideal gas behavior can generally be applied to vapor/carrier gas mixture described herein.

Concentration level controller 38 compares the measured value with a targeted value for the amount of vapor entrained within a given amount of carrier gas. The targeted concentration level may be established based on the performance criteria desired for the ultimate optical fiber to be drawn from the optical preform manufactured from a vapor deposition process utilizing the vapor delivery system of the present invention. However, it should be recognized that in accordance with the present invention, instead of directly measuring the actual concentration level one may measure a different parameter which can be used to ascertain the concentration level.

The crux of the present invention involves the principle that a pressure change within the vapor conduit 30 results in a change in the concentration level of the carrier gas entrained with vapor of the liquid present within the conduit 30. Based on this principle, the present invention in one embodiment employs valve 34 as a means to controllably varying the pressure within conduit 30 so as to maintain the concentration level equal to the targeted or desired concentration level.

The concentration level of the mixture of vapor to the carrier gas is proportional to the vapor pressure of the liquid divided by the total pressure of the mixture. This can be illustrated mathematically as follows:

$$\text{concentration level} \approx \frac{P_v}{P_{total}}$$

wherein $P_v$ represents the actual vapor pressure of the liquid and $P_{total}$ represents the pressure of the total mixture of carrier gas and entrained vapor, both at the given environmental conditions, i.e. temperature and pressure, in which the system is operating.

Valve 34 provides the ability to vary the pressure of vapor-entrained carrier gas flowing through the conduit 30, $P_{total}$. More specifically, opening valve 34 wider reduces the pressure in conduit 30 and increases the concentration level of the mixture of vapor and carrier gas ultimately reaching the deposition site. On the other hand, closing the valve 34, causes the pressure of vapor-entrained carrier gas flowing through the conduit 30 to increase thereby acting to decrease the concentration level of the mixture of vapor and carrier gas ultimately reaching the deposition site.

In a closed or static system, the vapor pressure is a function of temperature only. However, in an open or dynamic system, such as the vapor delivery system described herein, the vapor pressure above the liquid is also a function of the carrier gas flow rate. Therefore, to maintain the concentration level at a desired value, either the liquid temperature and/or the total pressure above the liquid may be manipulated to control the concentration level. As stated earlier, U.S. Pat. No. 4,276,243 attempts to maintain the desired concentration level by manipulating the temperature of the liquid, the present invention achieves a more rapid response by utilizing the pressure of the vapor-entrained carrier gas flowing through the conduit 30 to maintain the desired concentration level.

As a result of the present invention, many of the considerations that may lead to an undesirable concentration level are able to be obviated, or corrected for, by post vaporization adjustments. Some of the considerations and/or aspects which introduce adverse affects on the operation of a vapor delivery system include changes in the, 1) flow rate of the carrier gas through the vaporizer system, 2) ambient barometric pressure, 3) temperature of the liquid, and 4) downstream pressure and temperature perturbations (i.e. possibly due to the introduction of more chemicals into the system resulting in higher back pressure), for example.

Further discussion of some of the remaining elements of a vapor delivery system in accordance with the present invention are addressed below. In general, flow controller unit 28 includes a flow rate sensor. One commercially available flow rate sensor utilizes the principle that the temperature rise of a gas at a relatively constant pressure is a function of the amount of heat added, the mass flow rate and other properties of the gas. Constant power is supplied to the sensor unit which experiences a change in resistance when gas is flowed therethrough. An upstream sensor is cooled at a higher rate than a downstream sensor, providing a bridge imbalance. The bridge output then can be calibrated with actual gas flows that are monitored with a standard device such as a Brooks volumeter. A more detailed explanation of these types of flow rate sensors is provided in previously referenced U.S. Pat. No. 4,276,243.

With regard to the particulars of the concentration detector 36, it should be noted that a bridge circuit referenced immediately above and described in further detail in U.S. Pat. No. 4,276,243 is acceptable in accordance with the present invention. Additionally, commonly-assigned U.S. Pat. No. 5,501,098 entitled Acoustic Analysis of Gas Mixtures and issued in the name of Cadet et al. on Mar. 26, 1996 describes an alternative type of concentration detector that is likewise suitable for implementing the novel aspects of the present invention.

In operation, the reservoir 4 is partially filled with liquid chemicals which are to be deposited by vapor deposition at an unshown vapor deposition station such as where a fiber optic preform or rod is to be constructed. As shown in FIG. 1, according to one embodiment of the present invention, the reservoir 4 may be mounted at the same height as the bubbler 12. As a result the liquid chemicals flow from the reservoir through conduit 2 into the bubbler until the surface level of the liquid in the bubbler 12 equals that of the surface level of the liquid within the reservoir. A gas is then introduced under pressure into the reservoir 4 through conduit 8 to establish a desired level for the surface of the liquid within the bubbler 12. Alternatively, the reservoir 4 could be at a different elevation from the bubbler 12 and a valve 6 be used to control the flow of liquid into the bubbler 12 from reservoir 4.

With the desired level of liquid in the bubbler 12, the carrier gas, which as stated earlier may be oxygen ($O_2$), argon (Ar), helium (He) and/or nitrogen ($N_2$), for example, is introduced through the flow controller 28 and through the vaporizer system 10 and bubbled up through the liquid. Since the liquid in the bubbler 12 is maintained substantially constant, the rise time and size of the bubbles is preestablished by the size of the outlet 18 of the conduit 16. In turn, both the surface area and time of exposure of the bubbles of carrier gas to the liquid as the gas rises to the surface is also predetermined. Vapors thus diffuse into the bubbles themselves as well as occupying the space above the liquid within the bubbler 12. Vaporization also occurs at the surface of the liquid. It should be noted that in accordance with the present invention, the vaporizer system 10 is not required to be of the bubbler type.

Finally, the carrier gas carries the vapors out of the bubbler 12 through the inlet orifice 32 of conduit 30 and then upwardly through the conduit 30 to the concentration level detector 36 as described above. Once the concentration levels are appropriately set and controlled the mixture of vapors and carrier gas within conduit 30 may be mixed with gases and other vapors from other unshown vaporizers.

Figure 2:
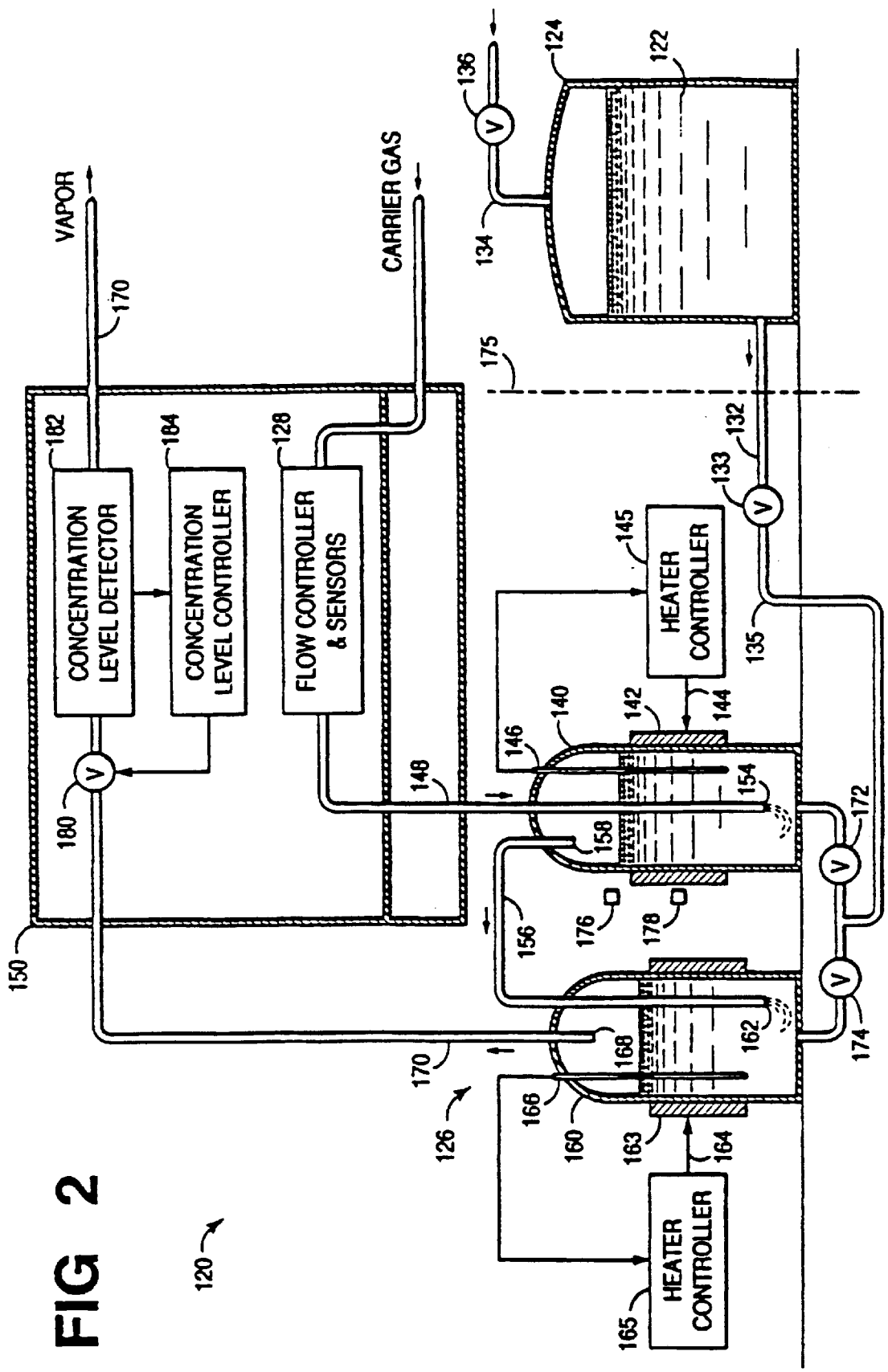
FIG. 2 is a schematic diagram of an alternative embodiment of a vapor delivery system embodying the principles of this invention.

In addition to a vaporizer system having a single bubbler as described above and shown in FIG. 1, an alternative embodiment illustrated in FIG. 2 includes a dual bubbler arrangement. As seen in FIG. 2, in the two bubbler embodiment, a bubbler system 126 includes a supply bubbler 140 and a deposition bubbler 160 which preferably is smaller than the supply bubbler 140. A carrier gas intake conduit 148 extends from an unshown source of pressurized gas into a temperature controlled chamber 150 and through the flow controller and sensor unit 128 therein. The flow controller and sensor unit 128 includes a flow rate sensor for the carrier gas. See U.S. Pat. No. 4,276,243 which issued on Jun. 30, 1981 in the name of F. P. Partus and which is expressly incorporated by reference herein.

After passing through the unit 128, the conduit 148 is directed downwardly out of the chamber 150 and into the supply bubbler 140 terminating in a lower inlet 154, preferably adjacent to the bottom of the supply bubbler 140. The inlet 154 may comprise a glass frit member which is effective to generate relatively small bubbles to enhance the bubbling of the carrier gas. A vapor stream conduit 156 extends upwardly from an intake orifice 158 located adjacent to the top of the supply bubbler 140 into the deposition bubbler 160. The conduit 156 terminates in an outlet 162 adjacent to the bottom of the deposition bubbler 160.

Through the top of the deposition bubbler 160 extends a vapor stream conduit 170. It extends from an intake 168 along a line 170 into a temperature-controlled chamber 150. As described with regard to the single bubbler embodiment, the present invention involves the utilization of a valve 180 and a concentration level detector 182 positioned in conduit 170, in conjunction with concentration controller 184, to manipulate the pressure within the conduit to adjust the concentration level of the mixture of carrier gas and vapor exiting the deposition bubbler 160. The operation of these components are identical in the two bubbler embodiment as described in great detail above with regard to the single bubbler embodiment, so no additional discussion will be provided at this point.

In operation, a liquid shipping container which may serve as a reservoir 124 is connected to a line 132 with a valve 133 being in the off position. The supply and deposition bubblers 140 and 160, respectively, are filled individually by opening valve 133, and opening and closing the valve 174, and then opening the valve 172. Afterwards, valve 133 is closed. Then a valve 136 located in a line 134 is opened to cause a pressurized gas to enter the reservoir 124.

The heaters 142 and 163 are used to control the temperature of the liquid in the supply and deposition bubblers 140 and 160, respectively, to vaporize liquid therein. In the embodiment shown in FIG. 2, which is characterized as being temperature controlled, signals corresponding to the temperatures sensed by the sensors 146 and 166, respectively, are provided to input terminals of the heater controllers 145 and 165, respectively. The heater controllers are conventional power controllers such as, for example, a 3-mode power controller sold by Research, Inc. as Model No. 639B. Each controller uses a temperature input to calculate an output which controls the current flow to one of the bubbler heaters.

A carrier gas which as stated earlier may be oxygen ($O_2$), argon (Ar), helium (He) and/or nitrogen ($N_2$), for example, is flowed into the flow controller and sensor unit 128. The signal from the carrier gas flow rate sensor (not shown) of the flow controller and sensor unit 128 is compared to a set point. An output signal is amplified and directed to a valve (not shown) positioned within the input conduit 148 to control the flow of the carrier gas.

The carrier gas is introduced along the conduit 148 into the supply bubbler 140 below a free surface thereof to cause vapor of the liquid to become entrained in the carrier gas. Then the vapor entrained carrier gas is flowed from the supply bubbler along the conduit 156 into the liquid in the deposition bubbler 160 and out of the deposition bubbler 160 to the deposition site. Introduction of the carrier gas into the liquid in the supply bubbler 140 and the deposition bubbler 160 causes bubbles to form and to rise to the liquid surface.

The rate of vaporization may be affected by the temperature of the liquid, the size of the bubbles and the residence time of the bubbles in the liquid. The quantity of liquid in the supply bubbler 140 is sufficient to enable suitable temperature control such that the carrier gas is partially saturated with vapor as it leaves the supply bubbler. The quantity of liquid and temperature are maintained generally to cause the vapor in the outflow from the supply bubbler preferably to be about 90 to 110% of the total amount of vapor which is entrained in the carrier gas and flowed out of the deposition bubbler to the deposition site. At 100% outflow from the supply bubbler the liquid level in the deposition bubbler does not change.

The use of two bubblers allow one, the supply bubbler 140, to act as a gross contribution bubbler while the deposition bubbler 160, is used to trim or fine tune the amount of vapor. Further, because of the relatively small net outflow of vapor, that is the outflow less the inflow, provided by the liquid in the deposition bubbler 160, the level of the liquid in that bubbler during a preform manufacturing run drops or rises only slightly and for feedback purposes remains substantially constant. As a result, unintended perturbations within the deposition bubbler 160 are prevented and adverse effects on feedback are minimized.

Typically, the difference between the outflow and inflow of vapor in the deposition bubbler 160 is relatively small, and may be controlled with temperature. In addition to such temperature manipulations to convey materials between the reservoir and/or bubblers, valve 174 may be used to directly introduce additional liquid into the deposition bubbler. However, it should be noted that the introduction of new material that is at a different temperature than that already in the bubbler may result in temperature perturbations.

The liquid level in the supply bubbler 140 is at least at a level such that the quantity of liquid in the supply bubbler 140 is sufficient to enable temperature control over the liquid therein which is suitable for the control of the mass flow rate of vapor into and out of the deposition bubbler. Mass flow rate in units of grams per minute, for example, is the product of the concentration in grams per cubic centimeter and the volumetric flow in cubic centimeters per minute. With the mass flow rate of vapor into the deposition bubbler being only slightly less than the mass flow rate of vapor therefrom in a preferred embodiment, the liquid level in the deposition bubbler 160 is maintained almost constant, i.e. within about +/−1 inch of the targeted level. If the level of the liquid in the supply bubbler 140 is so low that the heater 142 is not effective to provide suitable temperature control of the liquid therein, a greater imbalance of the mass flow rates into and out of the deposition bubbler 160 occurs. Inasmuch as less vapor is being entrained in the supply bubbler 140, the net vapor outflow form the deposition bubbler 160 increases, perhaps substantially. As a result of these perturbations in the deposition bubbler 160, the concentration level of the delivered vapor changes thereby affecting adversely the deposition in the optical preform.

Advantageously, presently used shipping containers of the liquids used in the vapor deposition process are sufficiently large so that they can be used to fill the supply bubbler 140 on a plurality of occasions with liquid sufficient for a preform manufacturing run. As a result, once the supply bubbler 140 is filled and valve 133 is closed, operation continues for the preform manufacturing run and there is no need to reopen valve 133. Furthermore, the shipping container can be disconnected from the bubbler system at valve 133 and used to fill other bubbler systems. The broken line 175 in FIG. 2 is used to indicated that the reservoir 124 need not be a permanent part of the system 120.

The present invention enables real time adjustments to be made to the concentration level of the vapor-entrained carrier gas within the conduit exiting the deposition bubbler. In this regard, there is less of a need to use any elaborate techniques to attempt to control the relative temperatures of the liquid within any of the bubblers and/or reservoirs as a method of maintaining the desired liquid level therein. Instead, as long as there is sufficient liquid to achieve the desired entrainment of vapor within the carrier gas, the present invention requires no manipulation of the liquid level(s) and/or temperature(s) during the time that material is being actually transferred from the vaporization system to a deposition site. Therefore, at least one advantage that the present invention has relative to existing vapor delivery systems is that the liquid levels within each of the bubblers and reservoirs need only be set prior to starting a deposition manufacturing pass or run and then left alone throughout the duration of that deposition run. In contrast, existing vapor delivery systems introduce additional liquid into the bubblers during a deposition run and as a result of the liquids being at different temperatures cause the concentration levels of the materials ultimately exiting the vaporization system to be adversely effected.

However, it should be recognized that some of the known techniques used to establish and maintain liquid levels may also be employed in conjunction with the present invention to fill the bubbler(s) prior to each deposition run. In particular, the system 120 may include a feedback loop which includes the valve 133 and a pair of detectors 176 and 178 such as photodetectors, for example, that are mounted adjacent to the exterior of the supply bubbler. See priorly identified U.S. Pat. No. 4,235,829 which is expressly incorporated by reference herein. As the level of the liquid supply bubbler 140 drops, it may reach a level which is aligned with the detector 178 at a low level for the supply bubbler.

In general, an electrical signal generated by either detector is functionally related to the level of the liquid in the supply bubbler 140. Should the level of the liquid in the supply bubbler 140 drop below the detector 178, a signal is provided to valve 133 which is energized to be opened to allow the liquid 122 in the reservoir under a pressure head to be moved through the open valve 172 into the supply bubbler 140. When the liquid level in the supply bubbler 140 rises to the level of the detector 176, another signal is provided to valve 133 to cause it to be closed thereby discontinuing liquid flow in the supply bubbler 140. As stated above, it should be recognized that if such temperature manipulations are used during a deposition run to control the liquid levels, unwanted temperature gradients may occur (since the newly introduced liquid may have a different temperature than that already in the bubbler) and result in carrier gas flow perturbations.

It is to be understood that the above-described arrangements are simply illustrative of the invention. Other arrangements may be devised by those skilled in the art which will embody the principles of the invention and fall within the spirit and scope thereof.

What is claimed is:

1. A method of manufacturing optical products comprising the steps of 1) establishing a core portion and 2) controlling the delivery of vapor of a liquid to a vapor deposition site, said method further including the steps of:

employing a bubbler which contains a quantity of the liquid and which is in fluid communication with the deposition site through a fluid communication path;

vaporizing a portion of the liquid in the bubbler;

introducing a gas into the bubbler to cause vapor of the liquid to become entrained in the gas and to flow from the bubbler to the deposition site through said fluid communication path;

detecting the concentration level of the gas and the entrained vapor in the communication path;

comparing the detected concentration level to a desired concentration level of the gas and vapor of the liquid for the system; and controlling the pressure within the fluid communication path between the bubbler and the deposition site on the basis of the comparison to cause the concentration level of a mixture of the gas entrained with vapor of the liquid to be regulated.

2. The method of claim 1 further comprising the steps of:

manipulating a valve positioned between the bubbler and the deposition site to vary the pressure between the bubbler and the deposition site as needed to maintain the concentration level of the vapor which is entrained in the gas to maintain a predetermined value.

3. The method of claim 2 wherein detecting of the concentration level of the carrier gas and vapor of the liquid occurs before fluid flow engages the valve positioned between the bubbler and the deposition site.

4. The method of claim 2 wherein detecting of the concentration level of the carrier gas and vapor of the liquid occurs after fluid flow engages the valve positioned between the bubbler and the deposition site.

5. The method of claim 1 further comprising the steps of:

providing an additional bubbler which contains a quantity of the liquid and which is in fluid communication with the bubbler which is in fluid communication with the deposition site.

6. The method of claim 5 further comprising the steps of:

maintaining the temperature of the liquid in the additional bubbler at a desired value relative to that of the liquid in the bubbler which is in fluid communication with the deposition site.

7. A method of controlling the delivery of vapor of a liquid to a vapor deposition site, said method including the steps of:

employing a bubbler which contains a quantity of the liquid and which is in fluid communication with the deposition site through a fluid communication path;

vaporizing a portion of the liquid in the bubbler;

introducing a gas into the bubbler to cause vapor of the liquid to become entrained in the gas and to flow from the bubbler to the deposition site through the fluid communication path;

detecting the concentration level fo the entrained vapor and the gas;

comparing the detected concentration level to a desired concentration level; and controlling the pressure within the fluid communication path between the bubbler and the deposition site on the basis of the comparison to cause the concentration level of a mixture of the gas entrained with vapor of the liquid to be maintained at a predetermined value.

8. The method of claim 7 further comprising the steps of:

manipulating a valve positioned between the bubbler and the deposition site to vary the pressure between the bubbler and the deposition site as needed to maintain the concentration level of the vapor which is entrained in the gas to maintain a predetermined value.

9. The method of claim 8 wherein detecting of the concentration level of the carrier gas and vapor of the liquid occurs before fluid flow engages the valve positioned between the bubbler and the deposition site.

10. The method of claim 8 wherein detecting of the concentration level of the carrier gas and vapor of the liquid occurs after fluid flow engages the valve positioned between the bubbler and the deposition site.

11. The method of claim 7 further comprising the steps of:

providing an additional bubbler which contains a quantity of the liquid and which is in fluid communication with the bubbler which is in fluid communication with the deposition site.

12. The method of claim 11 further comprising the steps of:

maintaining the temperature of the liquid in the additional bubbler at a desired value relative to that of the liquid in the bubbler which is in fluid communication with the deposition site.

* * * * *